United States Patent [19]

Suzuki et al.

[11] Patent Number: 4,930,128

[45] Date of Patent: May 29, 1990

[54] METHOD FOR RESTART OF ONLINE COMPUTER SYSTEM AND APPARATUS FOR CARRYING OUT THE SAME

[75] Inventors: Shuuji Suzuki, Yokohama; Kenzo Moriyama, Fujisawa; Yuuji Sueoka, Yokohama, all of Japan

[73] Assignee: Hitachi, Ltd., Tokyo, Japan

[21] Appl. No.: 211,045

[22] Filed: Jun. 24, 1988

[30] Foreign Application Priority Data

Jun. 26, 1987 [JP] Japan .................................. 62-159347

[51] Int. Cl.$^5$ ............................................. G06F 11/20
[52] U.S. Cl. ...................................... 371/12; 371/11.3
[58] Field of Search ................... 371/12, 13, 14, 11.3, 371/7, 66; 364/200, 900

[56] References Cited

U.S. PATENT DOCUMENTS

| | | | |
|---|---|---|---|
| 4,744,062 | 5/1988 | Nakamura | 371/13 |
| 4,819,154 | 4/1989 | Stitfler | 371/12 |
| 4,819,232 | 4/1989 | Krings | 371/12 |
| 4,831,513 | 5/1989 | Kanazawa | 371/12 |

OTHER PUBLICATIONS

Hitac Program Product VOS3/ES Center Management-JSS3.

*Primary Examiner*—Michael R. Fleming

*Attorney, Agent, or Firm*—Antonelli, Terry, Stout & Kraus

[57] ABSTRACT

In method and apparatus for restarting, after occurrence of a fault, an online processing system based on a computer employing a virtual storage system comprised of a main storage and a first auxiliary storage, a second auxiliary storage is additionally provided, occupied-/unoccupied status of slots on the first auxiliary storage is managed by an auxiliary storage management table of the main storage, data present in the main storage immediately after IPL is saved in a first area of the second auxiliary storage, data present in the main storage at the time of the occurrence of the fault is saved in a second area, and data occuring in the auxiliary storage management table at the time of the occurrence of the fault is saved in a third area. When restarting the system after the occurrence of the fault, the contents of the first area of the second auxiliary storage is reloaded on the main storage, and the data saved in the third area of the second auxiliary storage is registered in the auxiliary storage management table of the main storage. When dumping data present at the time of the occurrence of the fault, the data saved in the second area of the second auxiliary storage is dumped to the external storage and data present in the first auxiliary storage at the time of the occurrence of the fault is dumped to the external storage in accordance with the data saved in the third area of the second auxiliary storage.

5 Claims, 4 Drawing Sheets

METHOD FOR RESTART OF ONLINE COMPUTER SYSTEM AND APPARATUS FOR CARRYING OUT THE SAME

BACKGROUND OF THE INVENTION

This invention relates to method and apparatus for restart of an online system and more particularly to a quick system restart method and apparatus suitable for recovering the online system within a short period of time in the event of a system going down due to a trouble or fault of in the system.

In the online system, when a fault occurs during operation of the system and the system goes down, the system must be restarted for operation as fast as possible so that the influence of the system down condition may be minimized. To this end, in a prior art online system, the contents of a main storage present after completion of the initialization is saved in, for example, a disc volume in advance. When it comes to restarting the system following occurrence of a fault, the initial program load (IPL) is not executed, but the saved information is used to return the system to the initial status and the online program is then restarted. This can dispense with time for the IPL, which is a relatively long time, and hence will reduce the time for the system restart.

This type of system is disclosed in, for example, a manual entitled "HITAC PROGRAM PRODUCT VOS 3/ES center management—JSS3 edition" published by Hitachi, Ltd., December, 1984.

Generally, the online system employs a virtual storage architecture. In the virtual storage architecture, data is transferred frequently in units of a page or a program between a main storage (real storage) and an auxiliary storage. The data in a page unit is called page data and the data in a program unit is called swap data. Page data or swap data paged out from the main storage is stored in storage units called slots in the auxiliary storage. The available status of each slot on the auxiliary storage is managed by a bit map. For example, an occupied slot and an unoccupied slot are respectively represented by "1" and "0" in the bit map. This management information is called PDS (Page Data Set) information. Data can be paged out from the main storage to an unoccupied slot in the auxiliary storage in accordance with the processing control program which looks up the PDS information.

Incidentally, in the event of an online system down condition due to a fault, data present in the main storage as well as page data and/or swap data present in the auxiliary storage at the time the fault occurs must be dumped with the view of finding a cause of the fault. Conventionally, the dump of page data and/or swap data necessary to find a cause of a fault is performed in the course of the online system recovery processing and accordingly, it takes a long time for a large-scale system to perform the dump. It follows therefore that restart of the online processing program is difficult to achieve within a short period of time and the users at terminals are forced to wait a long time for enaging in the system before the system is restarted.

SUMMARY OF THE INVENTION

An object of this invention is to provide a system restart method and apparatus which can restart an online system within a short period of time by dumping page data and/or swap data present at the time of occurrence of a fault after restart of the online processing program.

According to the invention, to accomplish the above object, PDS information indicating whether individual slots in a first auxiliary storage are occupied or unoccupied at the time of occurrence of a fault is saved in a second auxiliary storage, and after restart of the online processing program, page data and/or swap data present at the time of the occurrence of the fault is dumped from the first auxiliary storage in accordance with the saved PDS information.

The PDS information for identifying slots in which page data and/or swap data paged out from a main storage (real storage) to the first auxiliary storage is stored is registered as a bit map in an auxiliary storage management table provided in the main storage, the bit map having correspondence to the individual slots in the first auxiliary storage. When data is paged out from the main storage to a slot in the first auxiliary storage, a bit of the bit map in auxiliary storage management table corresponding to that slot is rendered "1".

Slots in the first auxiliary storage which store page data and/or swap data present at the time of occurrence of a fault can be recorded by storing PDS information occurring in the auxiliary storage management table at the time of the occurrence of the fault into a restart volume (the second auxiliary storage).

Data stored in the main storage at the time of the occurrence of the fault is also stored into the restart volume.

In the system restart processing, the bit in the auxiliary storage management table corresponding to the slot occupied at the time of the occurrence of the fault is rendered "1" representative of occupation in accordance with the PDS information occurring in the restart volume at the time of the occurrence of the fault, and after the restart, the online processing program is not permitted to use that slot. Since, immadiately after completion of the execution of the IPL, data present in the main storage is stored into the restart volume in advance, the online processing program can be restarted by reloading the data into the main storage.

Even when the system is restarted without finding a cause of the previous fault, it is frequent that no another fault takes place. Accordingly, the restart of online processing service has priority over the finding of the cause of the fault.

At a desired time point following restart of the online processing program, page data or swap data is dumped from the slot in the first auxiliary storage occupied at the time of the occurrence of the fault in accordance with the PDS information in the auxiliary storage management table to provide virtual storage dump data for finding the cause of the fault. After the dump, the PDS information occurring in the management table at the time of the occurrence of the fault is reset and the occupied slot is released from occupation so as its enable to use.

DESCRIPTION OF THE PREFERRED EMBODIMENTS

The invention will now be described by way of example with reference to the accompanying drawings.

Figure 1:
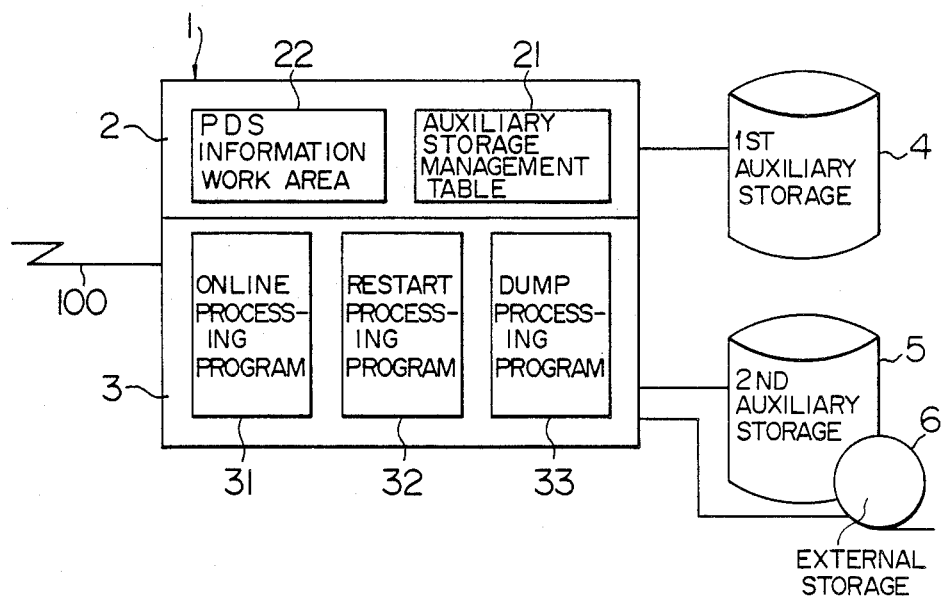
FIG. 1 is a schematic diagram illustrating the overall construction of an embodiment of a system restart apparatus according to the invention.

Referring now to FIG. 1, there is illustrated the overall construction of a system restart apparatus according to an embodiment of the invention. As shown, a central machine (host computer) 1 is connected to a remote sub-central machine and various terminal units, not shown, through a communication line 100, and the central machine 1 normally executes an online processing. The central machine 1 comprises a main storage (real storage) 2 and a central processing unit 3. The main storage 2 has an auxiliary storage management table 21 for saving PDS information and a work area 22 used for inputting and outputting the PDS information at the time that a fault occurs. The central processing unit 3 is loaded with an online processing program 31 as well as a restart processing program 32 started upon detection of a fault and a dump processing program 33 which can be started at a desired time point following restart of the online processing program. Coupled to the central machine 1 are a first auxiliary storage 4 for storing page data and/or swap data paged out from the main storage 2, a second auxiliary storage 5 serving as a restart volume in the event of occurrence of a fault and an external storage 6 for dumping data which is present in the main storage 2 and first auxiliary storage 4 at the time of occurrence of a fault. The main storage 2 and the first auxiliary storage 4 constitute a virtual storage system.

Figure 2:
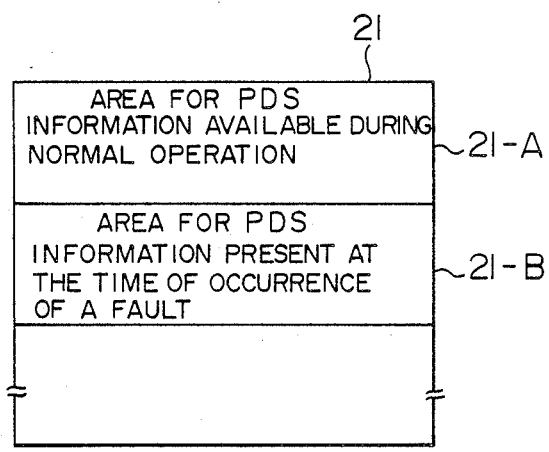
FIG. 2 is a diagram illustrating an example of the structure of the auxiliary storage management table in which PDS information is saved.

As shown in FIG. 2, the auxiliary storage management table 21 of main storage 2 contains an area 21-A in which the information (PDS information) indicative of occupied/unoccupied status during normal operation of individual slots on the first auxiliary storage 4 for storage of page data and/or swap data is registered and an area 21-B in which PDS information occurring at the time of occurrence of a fault is registered. Each of the areas 21-A and 21-B has a bit map indicative of the PDS information in correspondence to individual slots in the first auxiliary storage 4. For example, a bit of the bit map corresponding to an occupied slot is represented by "1" and a bit corresponding to an unoccupied slot by "0".

Figure 3:
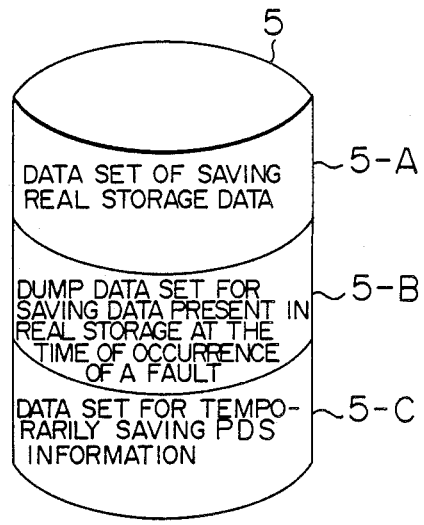
FIG. 3 is a diagram illustrating an example of the configuration of data sets in the restart volume.

As shown in FIG. 3, the second auxiliary storage (restart volume) 5 has a data set 5-A for duplicating and saving the contents of main storage (real storage) 2 present immediately after completion of the IPL, a dump data set 5-B for saving data present in the main storage at the time of occurrence of a fault, and a data set 5-C for temporarily saving PDS information occurring in the auxiliary storage management table 21 at the time of occurrence of a fault.

Figure 6:
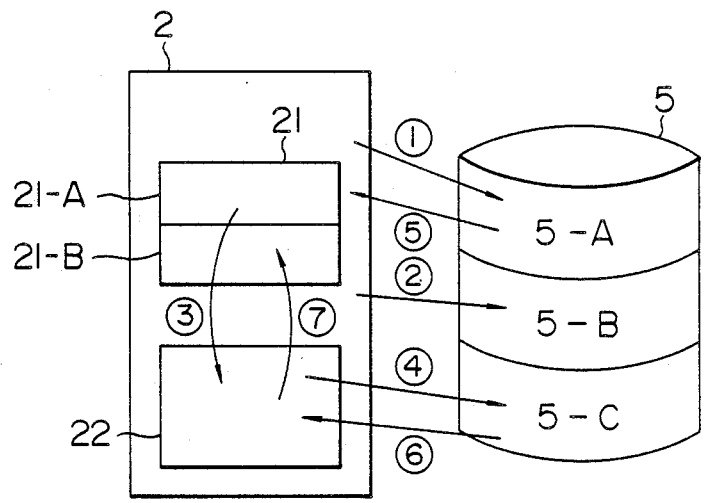
FIG. 6 is a diagram showing data flows ① to ⑦ in the flow charts of FIGS. 4 and 5.
Figure 4:
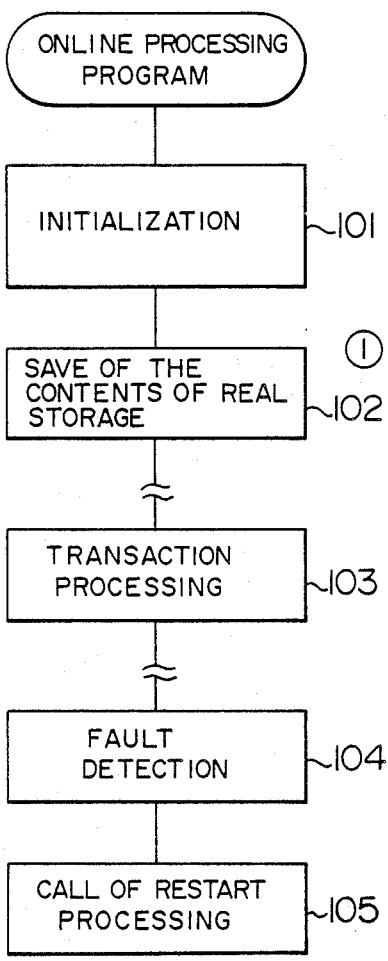
FIG. 4 is a flow chart of the online processing program.
Figure 5:
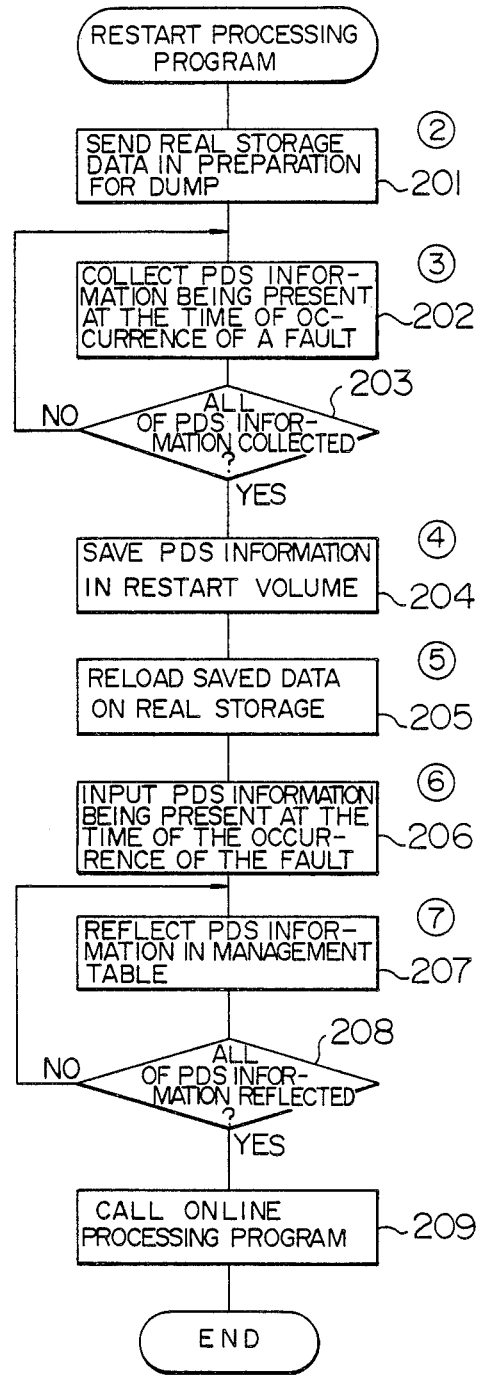
FIG. 5 is a flow chart of a restart processing program.

FIG. 4 shows a flow chart of the online processing program 31 and FIG. 5 shows a flow chart of the restart processing program 32 started at the time of detection of a fault. FIG. 6 shows data flows occurring between the main storage (real storage) 2 and the second auxiliary storage (restart volume) 5 at steps in the online processing program 31 and restart processing program 32.

Firstly, the online processing program 31 shown in FIG. 4 will be described. The contents of main storage 2, which is available after the initialization (IPL) such as OPEN of the data sets used in the online system has been completed in step 101, is saved in the first data set 5-A of the restart volume 5 (the second auxiliary storage), as shown at data flow ① in step 102. A transaction processing is subsequently carried out in step 103 and in the event that a fault, such as online overtime, abnormal end of task and system wait is detected during the transaction processing in step 104, the restart processing program 32 is called in step 105.

The restart processing program 32 proceeds as will be described with reference to FIG. 5. Firstly, at data flow ② in step 201, the contents of the main storage 2 are sent to the real storage data set 5-B of restart volume 5 (the second auxiliary storage) so that real storage data present in the main storage 2 at the time of occurrence of a fault may be ready for dump. Subsequently, at data flow ③ in step 202 and in step 203, PDS information occurring at the time of the occurrence of the fault is collected from the area 21-A in the auxiliary storage management table 21 of main storage 2 to the PDS information collection work area 22, and at data flow ④ in step 204, the collected PDS information is stored in the PDS information data set 5-C of the restart volume 5. After completion of storage of all of the PDS information, at data flow ⑤ in step 205, the data which has been saved in the first data set 5-A of the restart volume 5 after the initialization in the course of the online processing program 31 is reloaded in the main storage 5 to return the system to a status which is equivalent to the initialized status in the online processing.

Thereafter, at data flow ⑥ in step 206, the PDS information which has occurred at the time of the occurrence of the fault and has been temporarily saved in the data set 5-C of restart volume 5 is inputted to the PDS information collect work area 22 and at data flow ⑦ in step 207 and in step 208, the inputted PDS information is set in the area 21-B of auxiliary storage management table 21 so as to be reflected in the auxiliary storage management table. After all of the PDS information has been set in the area 21-B of auxiliary storage management table 21, the online processing program 31 is called in step 209 and the transaction processing is restarted in accordance with the online processing program 31. Till then, the area 21-A of the auxiliary storage management table 21 remains set to the initialized status because of data flow ⑤ in step 205. After restart, the auxiliary storage management table 21 is looked up by ORing the contents of the areas 21-A and 21-B, so that slots on the first auxiliary storage 4 which have been occupied by data at the time of the occurrence of the fault can not be permitted to be occupied by another data in the restarted online processing, and page data and/or swap data in these slots can be conserved as they were at the time of the occurrence of the fault.

In this manner, by simply performing a processing which permits the PDS information occurring at the time of occurrence of a fault to be reflected in the auxiliary storage management table 21, the online processing program can be restarted without dumping page data and/or swap data present at the time of occurrence of the fault. Contrary to this, the prior art restart program lacks the processings in steps 202, 203, 204, 206, 207 and 208 with the result that when the real storage is reloaded in step 205, the auxiliary storage management table 21 is initialized and therefore PDS information occurring at the time of occurrence of a fault can not be conserved. This leads to the necessity of a time-consuming dump processing of page data and/or swap data present in the auxiliary storage 4 at the time of occurrence of a fault, the dump processing being effected, after extraction of the contents of the real storage in the processing of step 201, in accordance with PDS information occurring in the auxiliary storage management table 21 at the time of the extraction or at the time of the occurrence of the fault. Advantageously, however, the present invention ensures that PDS information which has occurred at the time of occurrence of a fault can be saved in the area 21-B of the auxiliary storage management table 21, and accordingly page data and/or swap data present at the time of the occurrence of the fault can be dumped at a desired time point following restart of the online processing program.

Figure 7:
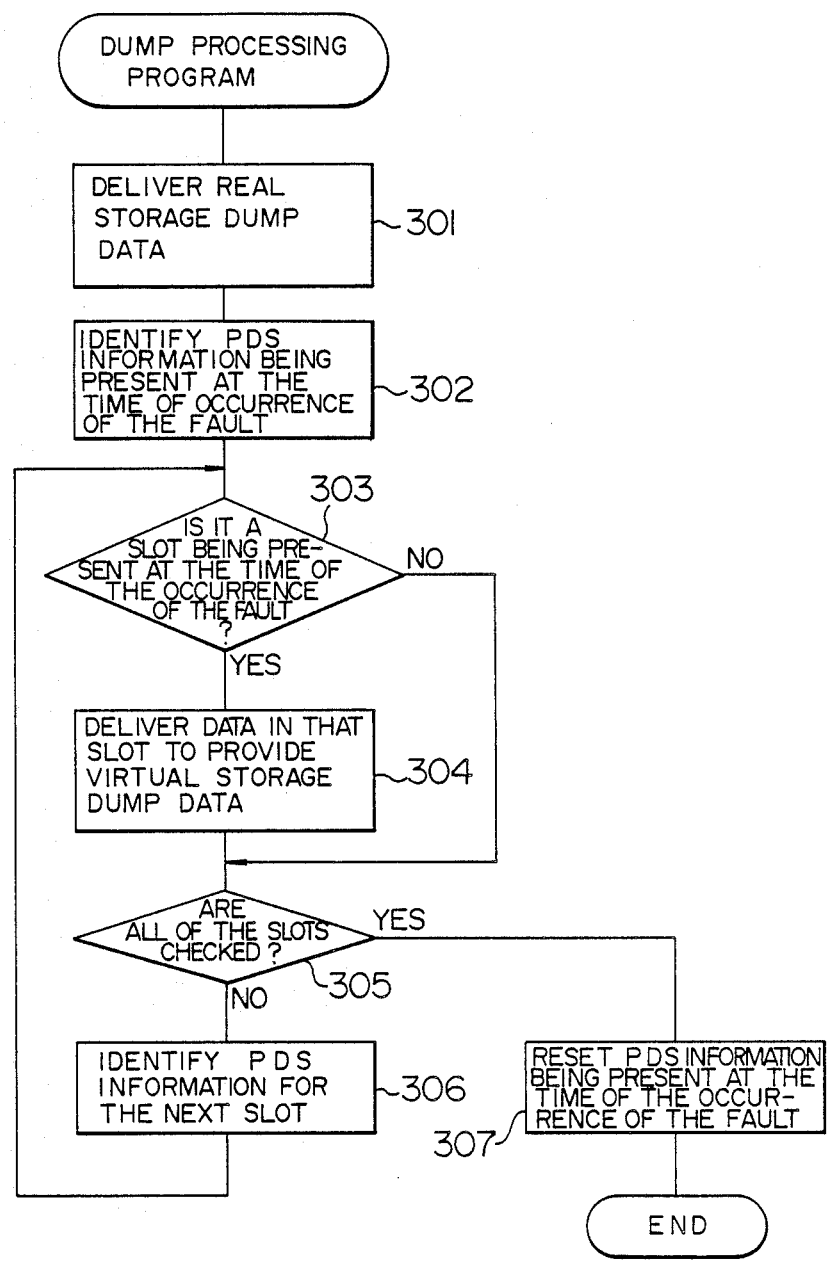
FIG. 7 is a flow chart of a dump processing program.

Real storage dump data in the main storage and virtual storage dump data in the first auxiliary storage are dumped for the purpose of finding a cause of a fault at a desired time following the restart of the online processing program 31 in accordance with the dump processing program 33, a flow chart of which shown in FIG. 7.

Firstly, in step 301, real storage dump data is delivered out of the real storage dump data set 5-B of restart volume 5 to the dump external storage 6. Subsequently, in steps 302 and 303, a slot in the first auxiliary storage 4 which is occupied by page data and/or swap data at the time of the occurrence of the fault is identified in accordance with PDS information which has occurred at the time of the occurrence of the fault and has been saved in the area 21-B of the auxiliary storage management table 21. In step 304, the page data and/or swap data in that slot is read out of the first auxiliary storage 4 and delivered to the external storage 6 to provide virtual storage dump data. All of the slots are checked for their occupation through steps 305 and 306. After completion of the dump of the real storage dump data and virtual storage dump data, the area 21-B of the auxiliary storage management table 21 is reset in step 307 so as to release those occupied slots from occupation. From then on, those slots on the first auxiliary storage 4 are permitted to store page data and/or swap data paged out from the main storage 2 through paging and/or swapping processings. Occupied/unoccupied status of the individual slots on the first auxiliary storage 4 is managed by the contents of the area 21-A of auxiliary storage management table 21.

As described above, according to the present invention, dump data present at the time of occurrence of a fault can be dumped at a desired time point following restart of the online processing program and in the event of occurrence of a fault, the system can be restarted within a short period of time. As the online system used for customer services increases in scale, the time required for dumping the dump data is increased and the effect of the present invention can be more greatly enhanced when the invention is applied to such a large-scale online system.

We claim:

1. A method for restarting, after a system goes down due to occurrence of a fault, an online processing system based on a computer which employs a virtual storage system comprised of a main storage, a first auxiliary storage and a second auxiliary storage, said method comprising the steps of:

effecting initialization of an online processing program;

storing data within said main storage of said virtual storage system into a first area of said second auxiliary storage immediately after the initialization of the online processing program;

registering information indicative of occupied/unoccupied status of individual data storage units in said first auxiliary storage into a first auxiliary storage management table of said main storage;

storing data present in said main storage at the time of occurrence of a fault and a consequent system down condition into a second area of said second auxiliary storage;

storing management information present in said first auxiliary storage management table at the time of the occurrence of the fault into a third area of said second auxiliary storage;

reloading the data, which is present in said main storage immediately after the initialization and which has been stored in said first area of said second auxiliary storage, into said main storage;

registering the management information, which has occurred at the time of the occurrence of the fault and then stored in said third area of said second auxiliary storage, into a second auxiliary storage management table of said main storage; and restarting the online processing program and utilizing said virtual storage system by accessing said first and second auxiliary storage management tables.

2. A system restart method according to claim 1 further comprising, after said online processing program ends, dumping out the data stored in said second area of said second auxiliary storage to an external storage included in said online processing system, and dumping out data present in said first auxiliary storage at the time of the occurrence of the fault to said external storage in accordance with the management information in said second auxiliary storage management table of said main storage.

3. A system restart method according to claim 2 further comprising resetting said second auxiliary storage management table after the data present in said first auxiliary storage at the time of the occurrence of the fault is dumped out to said external storage.

4. An online processing system based on a computer employing a virtual storage system comprised of a main storage and an auxiliary storage, comprising:

a central machine including said main storage and a central processing unit for execution of an online processing program and connected to terminal stations processing program and connected to terminal stations through communication lines;

a first auxiliary storage operatively associated with said main storage to form said virtual storage system;

means for storing an auxiliary storage management table in said main storage for registering information indicative of occupied/unoccupied status of individual data storage units in said first auxiliary storage; and a second auxiliary storage having means for storing in a first area data present in said main storage immediately after the initialization of said online processing program, means for storing in a second area data present in said main storage at the time of occurrence of a fault and a consequent system down condition, and means for storing in a third area management information present in said auxiliary storage management table at the time of the occurrence of the fault.

5. An online processing system according to claim 4 further comprising an external storage having means for storing, after said online processing program ends, the data stored in said second area of said second auxiliary storage and data present in said first auxiliary storage at the time of the occurrence of the fault in accordance with the management information in said auxiliary storage management table of said main storage.

* * * * *